United States Patent [19]
Bjerk

[11] 3,971,603
[45] July 27, 1976

[54] THRUST BEARING LUBRICATION

[75] Inventor: Roger Odell Bjerk, Edelstein, Ill.

[73] Assignee: Caterpillar Tractor Co., Peoria, Ill.

[22] Filed: Oct. 2, 1975

[21] Appl. No.: 618,985

[52] U.S. Cl. ............................ 308/168; 308/161; 308/122
[51] Int. Cl.² ........................................ F16C 1/24
[58] Field of Search ............... 308/121, 123, 16 B, 308/161; 184/6.16

[56] References Cited
UNITED STATES PATENTS

| | | | |
|---|---|---|---|
| 3,423,138 | 1/1969 | Hardy | 308/168 X |
| 3,685,617 | 8/1972 | Gardner | 308/168 X |

*Primary Examiner*—M. H. Wood, Jr.
*Assistant Examiner*—Gene A. Church
*Attorney, Agent, or Firm*—Wegner, Stellman, McCord, Wiles & Wood

[57] ABSTRACT

An improved slant axis rotary mechanism of the type including a housing defining a chamber including an operating cavity, a shaft journalled in the housing and including an angularly offset portion within the chamber, and a rotor within the chamber and journalled on the angularly offset portion. At least one thrust collar is located on the shaft and is operatively associated with one of the rotor and the housing. Thrust bearing means are provided on the one of the rotor and the housing and are in slidable engagement wth the thrust collar. At least one lubricant port in the thrust collar is provided and opens to the interface of the thrust bearing and the thrust collar. Means are provided for directing a lubricant under pressure to the port to provide excellent lubrication of the thrust collar during operation of the mechanism.

11 Claims, 3 Drawing Figures

THRUST BEARING LUBRICATION

BACKGROUND OF THE INVENTION

This invention relates to thrust bearings subjected to reversing loads as are present in slant axis rotary mechanisms used as engines, pumps, compressors, etc. More specifically, the invention relates to an improved means for lubricating thrust collars and bearings.

In typical thrust bearing structures employed in prior art slant axis rotary mechanisms, it is difficult to develop an oil film to insure adequate lubrication by reason of the typical utilization of flat elements resulting in a flat interface between a thrust collar and a thrust bearing. In general, some nonparallelism of the sliding components is required to develop a hydrodynamic oil film wtih load carrying capacity provided by converging portions of the oil film. Alternately, in bearings operating on the "squeeze film" principle, when the load reverses, it is supported readily because a finite time is required to squeeze oil out of the bearing through the rather narrow clearances employed. However, the load must not persist sufficiently long as to allow the film to be totally squeezed out of the bearing permitting metal-to-metal contact to occur. And, just as it takes a finite time to squeeze oil out of the bearings, a finite time is required to replenish the interface with oil so that another load cycle can safely take place with adequate lubrication.

SUMMARY OF THE INVENTION

It is the principal object of the invention to provide a new and improved slant axis rotary mechanism. More specifically, it is an object of the invention to provide such a mechanism with improved means for insuring adequate lubrication of thrust collars and bearings employed in such devices.

An exemplary embodiment of the invention achieves the foregoing objects in a slant axis rotary mechanism including a housing defining a chamber having an operating cavity. A shaft is journalled in the housing and includes an angularly offset portion within the chamber. A rotor is within the chamber and is journalled on the angularly offset portion. The shaft is provided with at least one thrust collar which is operatively associated with either the rotor or the housing. Thrust bearings are disposed on the one of the rotor and the housing with which the thrust collar is associated and are in sliding engagement with the thrust collar. The thrust collar is provided with at least one lubricant port which opens to the interface of the thrust bearing and thrust collar. Means are provided for directing a lubricant under pressure to the port. Thus, as the thrust collar rotates within the bearing, oil emanating from the port during the unloaded portion of the cycle is continually smeared on the thrust bearing to insure adequate lubrication.

According to one embodiment of the invention, the thrust collar is on the angularly offset portion of the shaft and the thrust bearings are carried by the rotor. According to another embodiment of the invention, the thrust collar is disposed exteriorly of the chamber and interiorly of the housing and the thrust bearing is carried by the housing.

According to still another embodiment of the invention, two thrust collars and thrust bearings are employed, one at each of the locations mentioned in the preceding paragraph.

According to a highly preferred embodiment of the invention, a check valve is associated with the port in the thrust collar for allowing the flow of lubricant to the interface of the bearing and the thrust collar while preventing reverse flow. Preferably, plural ports are provided on the collar and open to opposite faces of the same. Additionally, it is preferred that the thrust collar be provided with plural, angularly spaced ports on each surface thereof.

Other objects and advantages will become apparent from the following specification taken in connection with the accompanying drawings.

DESCRIPTION OF THE PREFERRED EMBODIMENT

Figure 1:
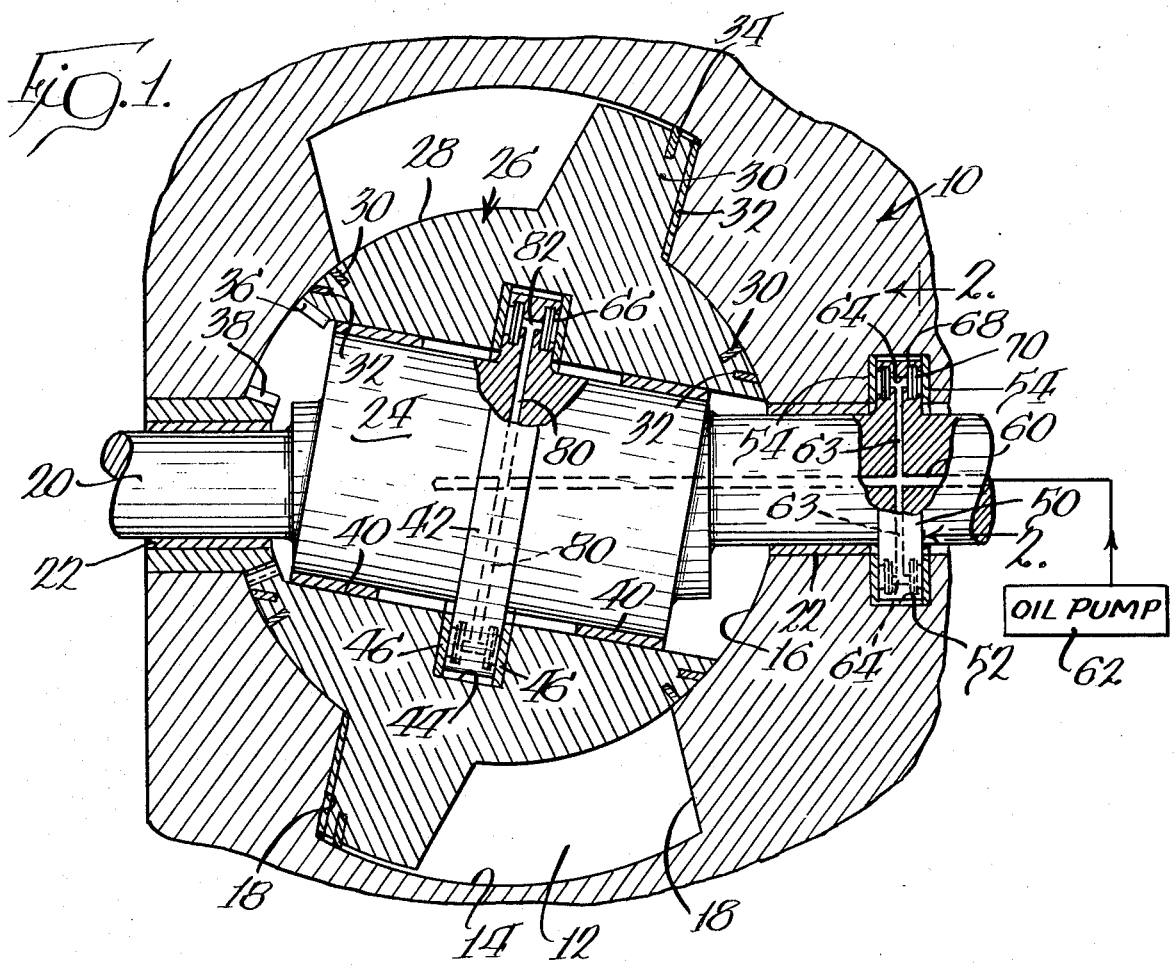
FIG. 1 is a sectional view of a slant axis rotary mechanism made according to the invention.

An exemplary embodiment of a slant axis rotary mechanism made according to the invention is illustrated in FIG. 1 in the form of an engine. However, it is to be understood that the invention is not limited to such a mechanism as employed as an engine, but may find use in such a mechanism when employed as a pump, compressor, or the like.

The mechanism includes a housing, generally designated 10, defining a chamber 12, a portion of which acts as an operating cavity, as is well known. The chamber 12 includes a radially outer partial spherical wall 14 and a radially inner partial spherical wall 16. The walls 14 and 16 are interconnected by generally radially extending side walls 18.

The shaft 20 is journalled by means of bearings 22 in the housing and an angularly offset portion of the shaft 20 is disposed within the chamber 12. The angularly offset portion journals a rotor, generally designated 26, having a spherical hub 28 and a peripheral, radially outwardly extending flange 30 as is well known. Compression seals 30 and oil seals 32 are carried by the hub 28 for sealing engagement with the radially inner spherical wall 16. The flange carries apex seals 32 and peripheral seals 34 for respective sealing engagement with the radially extending walls 18 and the outer spherical wall 14.

One end of the hub 28 is provided with an internal ring gear 36 which meshes with a timing gear 38 carried by the housing to establish the relative rates of rotation of the rotor 26 and the shaft 20.

The angularly offset portion 24 of the shaft 20 carries journal bearings 40 for journalling the rotor 26 on the shaft 20 and a peripheral, generally cylindrically shaped thrust collar 42. The thrust collar 42 extends into a groove 44 in the rotor 26 to be flanked by thrust bearings 46.

The shaft 20 also carries, at a location exteriorly of the chamber 12 and interiorly of the housing, a second thrust collar 50 which is generally cylindrical in configuration and which is received in a groove 52 in the housing to be flanked by thrust bearings 54.

Figure 2:
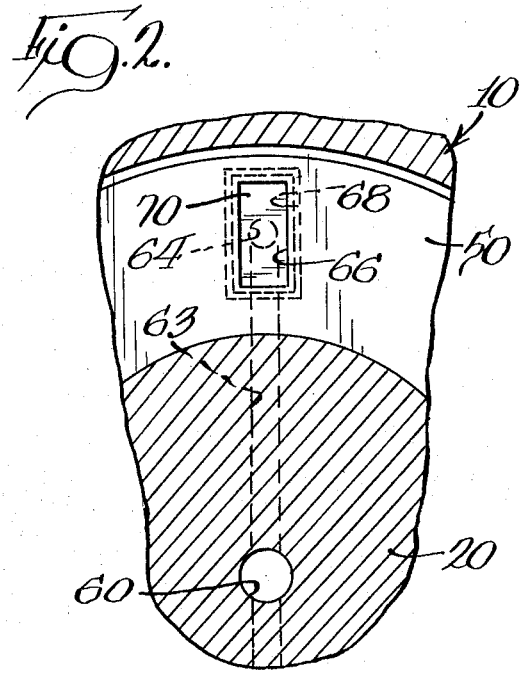
FIG. 2 is an enlarged, vertical section taken approximately along the line 2—2 of FIG. 1.

The shaft 20 includes a central bore 60 which is connected to an oil pump 62 for delivery of oil to the bore 60. At the location of the thrust collar 50, a pair of radially extending bores 63 in fluid communication with the bore 60 extend to axial bores 64 which open at ports 66 at diametrically opposite locations on both sides of the thrust collar 50 to the interface of the thrust bearings 54. As can be seen in FIG. 2, the ports 66 are elongated radially so as to extend across well more than the majority of the corresponding face of the thrust collar 50, and thereby act to spread oil emanating from the port well across the adjacent thrust bearing 54.

Preferably, each port 66 is backed by a chamber 68 within the interior of the thrust collar of a somewhat larger size than the port 66 itself. Within each chamber 68 is a flat valve member 78 having a thickness less than the depth of the chamber and constructed to act as a check valve to allow oil to be pumped out of each port 66 but to preclude backflow. The specific constructional details of the check valve member 70 with respect to the port 66 and the chamber 68 may be easily determined by those skilled in the art and form no part of the present invention.

The bore 60 also extends along the shaft 20 to a point within the angularly offset portion 24 and is in fluid communication with generally radially extending bores 80 within the thrust collar 42. Cross bores 82 in fluid communication with the bores 80 open to identical ports 66 also provided with chambers 68 and valve members 70 at the interface of thrust collar 42 and thrust bearings 46.

Figure 3:
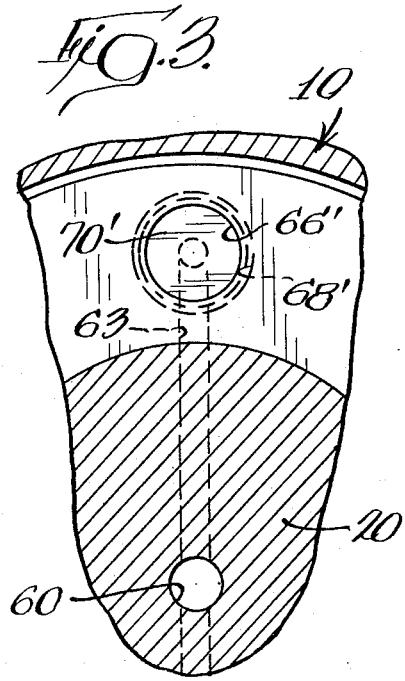
FIG. 3 is a view similar to FIG. 2 but of a modified embodiment of the invention.

FIG. 3 illustrates an alternate construction wherein a port 66' is circular rather than elongated. It is again to be noted that the port 66' extends across the majority of the corresponding face of the thrust collar. Again, a valve member 70' is employed in connection with a chamber 68' backing the port 66'.

From the foregoing, it will be appreciated that oil from the pump 62 will be pumped to the interfaces of the thrust collars and thrust bearings to assure, at all times, the presence of a film of lubricating oil and to serve as a makeup source for the necessary oil film after the oil film has been squeezed out of the interface upon each reversal of load.

In the illustrated mechanism, the ports are located at 180° spacing on the respective thrust collars. This is a preferred embodiment for a four-cycle mechanism as load reversal will occur every 180° of rotation of the shaft 20. Of course, other porting arrangements may be employed with advantage.

What is claimed is:

1. A slant axis rotary mechanism comprising:
   a housing defining a chamber including an operating cavity;
   a shaft journalled in said housing and including an angularly offset portion within said chamber;
   a rotor within said chamber and journalled on said angularly offset portion;
   at least one thrust collar on said shaft and operatively associated with one of said rotor and said housing;
   thrust bearing means on said one of said rotor and said housing in sliding engagement with said thrust collar;
   at least one lubricant port in said thrust collar and opening to the interface of said thrust bearing means and said thrust collar; and
   means for directing a lubricant under pressure to said port.

2. The slant axis rotary mechanism of claim 1 wherein said thrust collar is on said angularly offset portion and said thrust bearing means are on said rotor.

3. The slant axis rotary mechanism of claim 1 wherein said thrust collar is disposed on said shaft exteriorly of said chamber and interiorly of said housing; and said thrust bearing means are on said housing.

4. The slant axis rotary mechanism of claim 1 wherein there are two said thrust collars on said shaft, one on said angularly offset portion and one spaced therefrom to be exterior of said chamber and within said housing, said thrust bearing means including a thrust bearing on said rotor and a thrust bearing on said housing.

5. The slant axis rotary mechanism of claim 1 further including check valve means associated with one of said port and said directing means for allowing the flow of lubricant out of said port but not the reverse.

6. The slant axis rotary mechanism of claim 1 wherein said thrust collar includes opposed thrust receiving surfaces and there is at least one of said ports in each of said surfaces.

7. The slant axis rotary mechanism of claim 6 wherein said ports are interconnected.

8. The slant axis rotary mechanism of claim 1 wherein said thrust collar is provided with plural, angularly spaced ones of said ports.

9. A thrust bearing comprising: first and second relatively rotatable elements; at least one thrust collar carried by one of said elements; thrust bearing means carried by the other of said elements and in sliding engagement with said thrust collar; at least one lubricating port in said thrust collar and opening to the interface of said thrust bearing means and said thrust collar; and means for directing a lubricant under pressure to said port.

10. The invention of claim 9 further including check valve means associated with one of said port and said directing means for allowing the flow of lubricant out of said port but not the reverse.

11. A rotary mechanism including the thrust bearing of claim 9 wherein said one element comprises the shaft of a rotary mechanism and said other element comprises the rotor of a rotary mechanism.

* * * * *